United States Patent
Sutherlin et al.

(10) Patent No.: US 8,740,468 B2
(45) Date of Patent: Jun. 3, 2014

(54) APPARATUS WITH SECONDARY LOAD PATH FOR VEHICLE WHEEL BEARING ASSEMBLY AND FEATURE TO INHIBIT CORROSION

(75) Inventors: Robert G. Sutherlin, Farmington Hills, MI (US); Douglas N. Reed, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 451 days.

(21) Appl. No.: 13/075,580

(22) Filed: Mar. 30, 2011

(65) Prior Publication Data

US 2011/0243487 A1 Oct. 6, 2011

Related U.S. Application Data

(60) Provisional application No. 61/320,947, filed on Apr. 5, 2010.

(51) Int. Cl.
 *F16C 13/00* (2006.01)
(52) U.S. Cl.
 USPC .......................................................... 384/544
(58) Field of Classification Search
 USPC ........................... 384/513, 545, 586, 589, 622
 See application file for complete search history.

(56) References Cited

U.S. PATENT DOCUMENTS

| | | | |
|---|---|---|---|
| 3,583,511 A | 6/1971 | Asberg | |
| 4,269,460 A | 5/1981 | Orain | |
| 4,618,159 A * | 10/1986 | Kozyra et al. | 280/93.512 |
| 7,524,115 B2 * | 4/2009 | Komori | 384/476 |
| 8,303,190 B2 * | 11/2012 | Shigeoka | 384/544 |
| 2007/0076994 A1 * | 4/2007 | Norimatsu et al. | 384/486 |
| 2009/0220183 A1 * | 9/2009 | Meeker et al. | 384/544 |
| 2011/0135233 A1 * | 6/2011 | Sutherlin et al. | 384/513 |

FOREIGN PATENT DOCUMENTS

| | | |
|---|---|---|
| DE | 2707352 A1 | 8/1978 |
| EP | 1950435 A1 | 7/2008 |
| EP | 2184181 A1 | 5/2010 |
| GB | 1319680 A | 6/1973 |
| JP | 2005-291485 | * 10/2005 |
| JP | 2007-271055 | * 10/2007 |

OTHER PUBLICATIONS

Translation of JP2007-271055 (May 14, 2013).*
European Search Report for EP1950435A1, Jan. 22, 2010, Munich Germany.
Anonymous, Design options to improve Brinnell performance for wheel bearings, Research Disclosure Journal, 1121, 536048, Published on Dec. 10, 2008, emailed to Research Disclosure on Nov. 20, 2008 for publication.

* cited by examiner

*Primary Examiner* — James Pilkington
(74) *Attorney, Agent, or Firm* — Quinn Law Group, PLLC (57) ABSTRACT

The apparatus includes a first component mounted for rotation with the wheel and a second component spaced from the first component by a predetermined gap and not connected for rotation with the wheel. One of the first and the second components is displaced relative to the other upon a force to close the gap and contact the other component to form a load path for the force. The load path is a secondary load path that bypasses the bearing races, preventing excessive plastic deformation of the races. The apparatus is configured with at least one feature to inhibit corrosion of the first and second components at the gap. The feature may be an extension of the second component that localizes the gap to just a portion of the second component. Alternatively, coatings, shims, lubricants, and seals may be used alone or in combination to prevent corrosion at the gap.

13 Claims, 9 Drawing Sheets

APPARATUS WITH SECONDARY LOAD PATH FOR VEHICLE WHEEL BEARING ASSEMBLY AND FEATURE TO INHIBIT CORROSION

CROSS-REFERENCE TO RELATED APPLICATIONS

This application claims the benefit of U.S. Provisional Patent Application No. 61/320,947, filed Apr. 5, 2010, and which is hereby incorporated by reference in its entirety

TECHNICAL FIELD

The invention relates to an apparatus that provides a load path for a lateral force applied to a vehicle wheel assembly.

BACKGROUND

A lateral load on a vehicle wheel, such as by a curb impact, is typically borne along a load path through the rolling elements and bearing races of the wheel bearing assembly. The rolling elements and bearing races are designed to handle these lateral forces without causing excessive plastic deformation of the races, referred to as Brinell damage, as excessive plastic deformation can result in bearing vibration and noise. Typical solutions implemented to prevent excessive Brinell damage include increasing the size of the bearings and surrounding brake corner components. However, this increases component weight. Tapered bearings are sometimes used as they have a greater contact area with the races and thus can dissipate a greater load. However, tapered bearings have higher drag, reducing vehicle efficiency. Some bearings are asymmetrical, having a first row of rolling elements of larger diameter or increased number than a second row of rolling elements. The increased number or size of bearing elements reduces the stress on each element and the localized area of the raceway that is in contact with each element. This design option also increases weight and cost, and requires redesign of the bearing races.

SUMMARY

One solution creates a secondary load path for loads resulting from a curb impact, a pothole, or off-road use, decreasing the load borne by a load path through the rolling elements and bearing races, thus preventing excessive Brinell damage. The solution does not add significant weight or component complexity. The apparatus includes a first component mounted for rotation with the wheel and a second component spaced from the first component by a predetermined gap and not connected for rotation with the wheel. One of the first and the second components is displaced relative to the other upon application of a force to close the gap and contact the other of the first and second components to at least partially form a load path for the force. The load path is a secondary load path that bypasses the bearing races, preventing excessive plastic deformation of the races. Some loading still follows the initial load path through the races, but the secondary, parallel load path prevents any significant increase in stress on the races.

A potential complication of this solution is the tendency of the first and second components to corrode over time. Because the predetermined gap must be a controlled width in order to close upon application of a predetermined level of force (thus protecting the bearings from damage that may occur upon greater forces), a level of corrosion that is acceptable for a typical wheel or brake assembly can more easily lead to drag and noise in a design with a tighter clearance. To overcome this complication, the apparatus is configured with at least one feature to inhibit corrosion of the first and second components at the gap. The feature may be an extension of the second component that localizes the gap to just a portion of the second component. Alternatively, coatings, shims, lubricants, and seals may be used alone or in combination to prevent corrosion at the gap.

The above features and advantages and other features and advantages of the present invention are readily apparent from the following detailed description of the best modes for carrying out the invention when taken in connection with the accompanying drawings.

DETAILED DESCRIPTION

Figure 1:
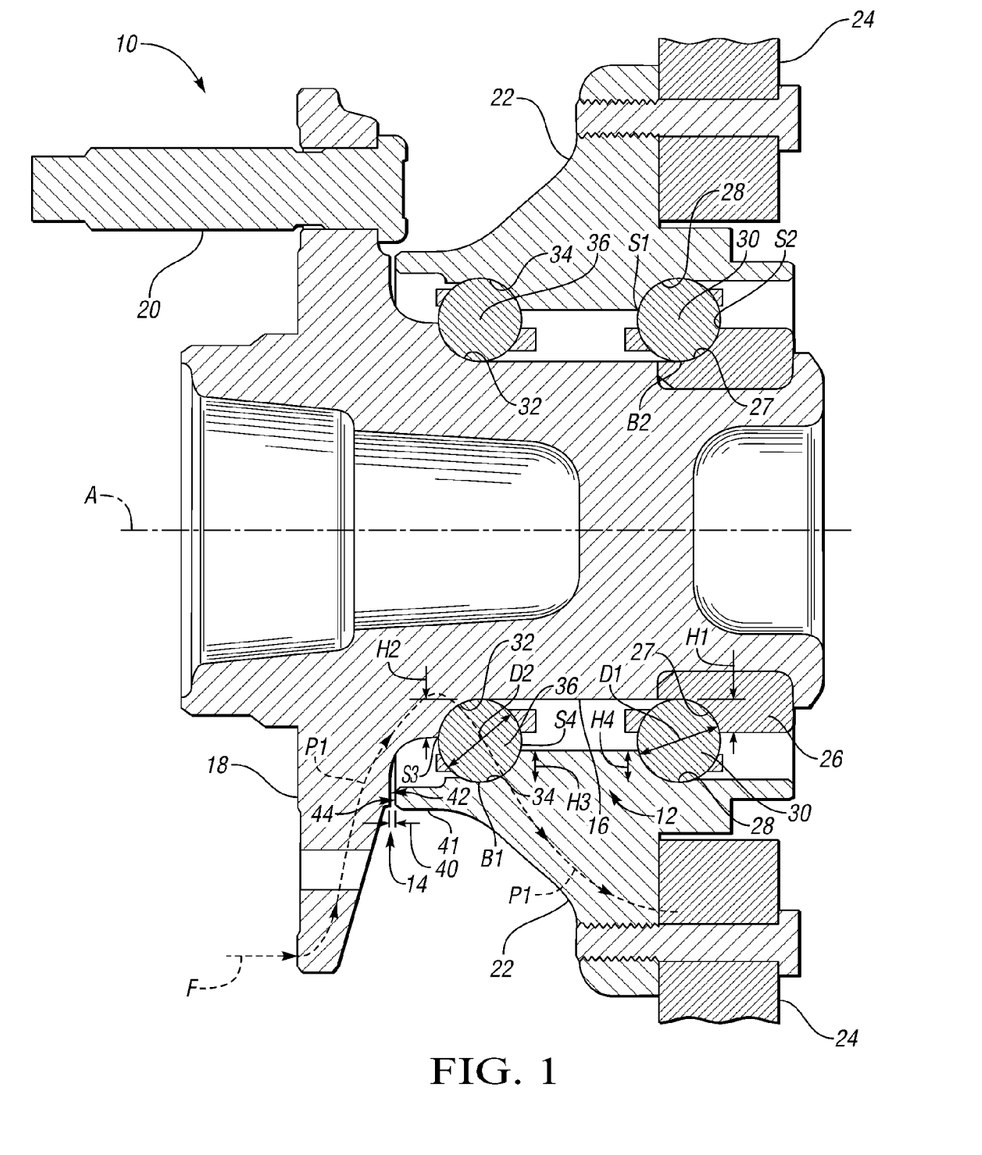
FIG. 1 is a schematic cross-sectional illustration of a portion of a vehicle having a wheel bearing assembly with wheel races and a first embodiment of an apparatus configured to provide a secondary load path, taken at the lines 1-1 of FIG. 3 shown prior to an applied force, and having an extension that provides a portion of the secondary load path and has a corrosion-inhibiting feature.

Referring to the drawings, wherein like reference numbers refer to like components throughout the several views, FIG. 1 shows a portion of a vehicle 10 with a wheel bearing assembly 12 for supporting a wheel (not shown). An apparatus 14 is provided that forms a secondary load path during an applied force, such as a force resulting from a curb impact, a pothole, or off-road use, to reduce the load borne by the wheel bearing assembly 12, thereby improving the Brinell performance of the bearing assembly 12, as further described below. The apparatus 14 creates a gap 40 that is closed upon an application of a sufficient force F to provide a secondary load path. Because the gap 40 is of a relatively small size, one or more corrosion-inhibiting features are provided at the gap 40 to ensure that any corrosion of components at the gap 40 does not fill or partially fill the gap.

The bearing assembly 12 includes a rotatable wheel hub 16, also referred to herein as a first component, having a flange 18 to which a wheel is mounted by fasteners 20 (one shown). Wheel hub 16 is also referred to as a wheel mounting component. The wheel hub 16 rotates about axis A. The bearing assembly 12 also includes a bearing outer ring 22, also referred to herein as a second component, adapted to be fastened or otherwise secured to vehicle suspension structure 24 such that it is substantially nonrotatable about axis A.

The bearing assembly 12 has an annular inner bearing ring 26 secured for rotation with the wheel hub 16 and defining an inner bearing race 27. An outer bearing race 28 is defined by the bearing outer ring 22. The bearing races 27, 28 support a first set of rolling elements 30 that aid in rotation of the wheel hub 16 relative to the bearing outer ring 22. The wheel hub 16 defines another inner bearing race 32 and the outer ring 22 defines another outer bearing race 34. A second set of rolling elements 36 are supported between the races 32, 34. The bearing races 27, 28 and rolling elements 30 are relatively inboard on the vehicle 10 and the bearing races 32, 34 and rolling elements 36 are relatively outboard on the vehicle 10. The rolling elements 30, 36 of this embodiment are balls. Accordingly, the bearing races 27, 28, 32 and 34 have generally arcuate profiles to allow low friction rotation of the rolling elements 30, 36. The outer races 28 and 34 have arcuate profiles with a base and a shoulder. The base is the portion of the arcuate profile furthest from the axis of rotation for the outer bearing races 28, 34 and closest to the axis of rotation for the inner bearing races 27, 32. For example, base B1 and shoulder S4 are shown on race 34. Base B2 and shoulder S1 are shown on race 28. Although ball rolling elements are shown in the bearing assembly 12 of FIG. 1, any of the bearing assemblies described herein may have tapered bearings, a combination of a row of tapered bearings and a row of ball bearings, rows with differently-sized tapered or ball bearings, several rows of bearings, or any other bearing configuration. Other types of bearing assemblies are within the scope of the claimed invention, such as those in which the inner race is not integrally formed with the wheel hub and the outer race is not integrally formed with vehicle suspension structure.

As shown, the diameters D1, D2 of the respective rolling elements 30, 36 and the shoulder heights H1, H2, H3, H4 of the respective raceways 27, 28, 32, 34 are generally equal. However, the inboard rolling elements 30 and the outboard rolling elements 36 may be of different sizes. Additionally, the shoulder heights H1, H2, H3 and H4 may be different. In some embodiments, the shoulder heights H1, H2, H3 and H4 are 30 to 50 percent of the respective diameters D1, D2 in order to prevent excessive stress concentrations in the hub 16 or outer ring 22, as can occur with low shoulder heights.

In the event that a tire rotating with a wheel on wheel hub 16 strikes a curb or other relatively low object with at least a partially lateral impact, hits a pothole, or is used off-road, a force, shown in FIG. 1 as an inboard-directed force F, will be transmitted to the wheel hub 16. The force F is represented by an arrow acting directly on the wheel hub 16, although the force may occur below the level shown. Although shown as an inboard-directed force in FIG. 1, the force may be in any direction that includes a laterally inboard or laterally outboard component. In a typical wheel bearing assembly, the energy of the force will be absorbed along a first load path P1 represented by the phantom arrow shown in FIG. 1. Thus, the load is transmitted via the rolling elements 36 and the races 32, 34 from the wheel hub flange 18 to the outer bearing ring 22 and the suspension member 24. The representative force F causes a counterclockwise moment on the flange 18, displacing the hub 16 and raceways 32, 27 slightly inward relative to their position prior to application of the force. This can cause the points of contact of rolling elements 30, 36 to shift with respect to the races 27, 28, 32, 34, potentially all the way to the edges of the shoulders S1, S2, S3, S4, resulting in stress concentrations at the edges of the shoulders S1, S2, S3, S4.

Figure 2:
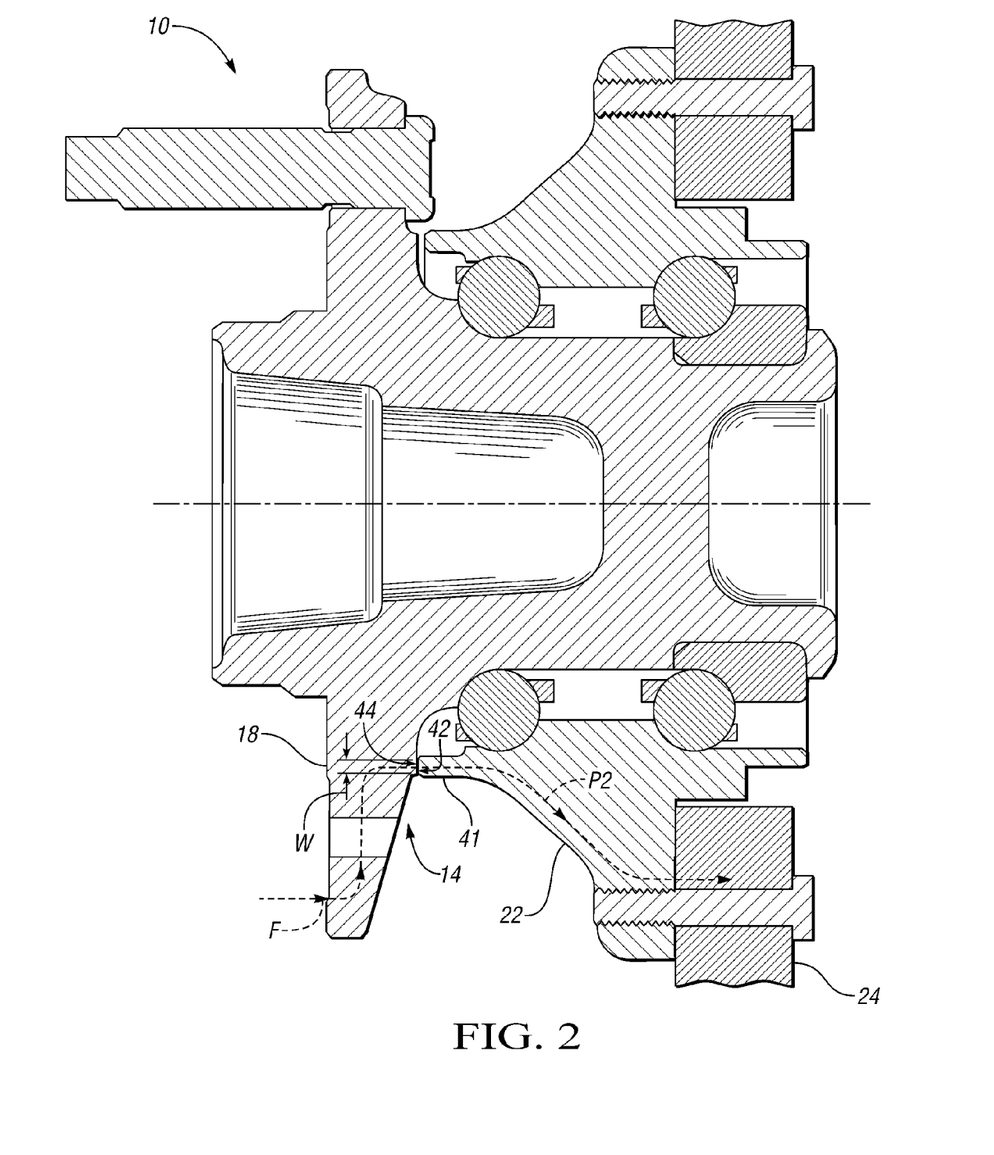
FIG. 2 is a schematic cross-sectional illustration of the portion of the vehicle of FIG. 1 after the applied force, showing the secondary load path formed that bypasses the wheel bearing races.

As discussed above, a typical bearing assembly is usually designed with large ball rolling elements or tapered rolling elements to prevent Brinell damage. With the apparatus 14 of bearing assembly 12, however, a gap 40 (also referred to as a clearance) between an annular surface 42 of the flange 18 facing the outer ring 22 and an annular surface 44 of an extension 41 of the outer ring 22 facing the flange 18 is controlled to a predetermined width to ensure that the surface 42 will contact the surface 44 at a predetermined level of force F, as shown in FIG. 2. Contact between the surfaces 42, 44 creates an alternative load path P2 shown in FIG. 2 from the flange 18 to the outer ring 22 to the suspension structure 24. Some of the load is carried along the secondary load path P2 that bypasses the rolling elements 30, 36 and races 27, 28, 32, 34, reducing the load that must be carried along the initial load path, preventing Brinell damage without requiring a larger bearing assembly or larger rolling elements.

The size of the gap 40 is partially dependent upon the distance of the intended area of contact (between surfaces 42, 44) from the axis A, as movement of the flange 18 in a lateral direction increases as distance from axis A increases. Testing has shown that for a bearing assembly 12 having an outer ring 22 with an effective diameter of 80 mm, a gap 40 of 0.4 mm provides some improvement in Brinell performance and a gap of 0.3 mm provides substantial improvement in preventing Brinell damage to the races 27, 28, 32, 34. The gap 40 must be large enough to avoid unintended contact between the surfaces 42, 44 during high speed turns of the wheel, or during high G turns below a certain magnitude.

The radial width W (see FIG. 2) of the area of contact between the surfaces 42, 44 should be wide enough to avoid creating excessive stress in the extended portion 41. The shoulder heights H1, H2, H3, H4 of the races 27, 28, 32, 34 may be greater than about 30% and less than about 50% of the diameters D1, D2 of the rolling elements 30, 36. The slight shift of the point of contact of the rolling elements 30, 36 along the races 27, 28, 32, 34 may be limited to a change in height of the points of contact above the base of the races along the race profiles of not more than about 35% of the diameter of the rolling elements 30, 36. It should be appreciated that, although the rolling elements 30, 36 are shown having the same diameter D1, D2, they could have different diameters. For example, the diameter of the outboard rolling elements 36 may be larger than the diameter of the inboard rolling elements 30. Furthermore, the rolling elements 30, 36 may be different types. For example, the outboard rolling elements 36 could be tapered bearings while the inboard rolling elements 30 are ball-type bearings. Tapered bearings generally disperse force over a wider area of contact with the bearing races, allowing greater loading without excessive stress concentration. A similar extension 45 is at circumferentially-spaced from extension 41, and is at the 12-o'clock position in this embodiment.

In the embodiment of FIGS. 1 and 2, the gap 40 is created by extending a portion 41 of the outer ring 22 toward the flange 18. As is more clearly shown in FIG. 3, the extension 41 is only a segment of an annulus 43 of the outer ring 22 so that the gap 40 is defined only at the extension 41, with a similar gap at the similar extension 45. This minimizes the area of contact of the nonrotating surface 42 to the surface 44 of the extension 41 in comparison to, for example, a gap created between the entire circumference of annulus 43 and the flange 18. By minimizing the contact area between the rotating component (wheel hub 16) and the nonrotating component (outer ring 22), and minimizing the location of the gap 40 to this contact area, there is a smaller area of concern at which corrosion must be prevented. Furthermore, any material that corrodes at the extension 41 may be more easily broken off during contact with the hub 16 than if the hub 16 interfaced with the entire annulus 43. The extension 41 is offset from axis A at a predetermined location, specifically to interface at the lowest, centered position of the wheel hub 16, referred to as "the six o'clock position", where over-stress from a curb impact is most likely to direct a force inboard toward the bearing assembly 12. In other embodiments, only extension 41 may be provided. Alternatively, in still other embodiments, the extension could include the entire circumference of the annulus 43, if the annulus 43 was modified to have an angled or rounded profile to reduce the surface area at the gap 40, similar to the profiles of the extensions of FIGS. 7-9, described below.

Figure 4:
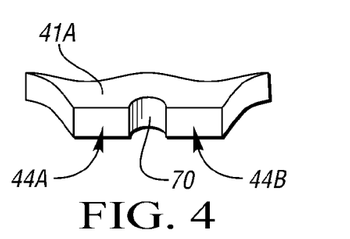
FIG. 4 is a schematic perspective illustration in fragmentary view of a a first alternate embodiment of the extension of FIG. 3.

FIGS. 4-9 illustrate alternate ways of configuring the extension 41 to localize the contact area at the gap 40 even more. In FIG. 4, an extension 41A is shown formed with a notch 70 that decreases the surface area of extension 41A to areas 44A and 44B. By minimizing the surface area 44A, 44B, less noise and drag will be created from any corrosion at the surface areas 44A, 44B.

Figure 5:
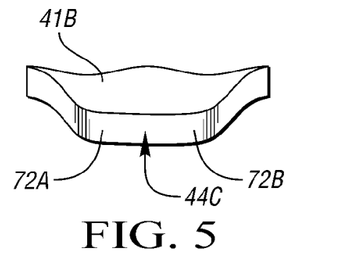
FIG. 5 is a schematic perspective illustration in fragmentary view of a second alternate embodiment of the extension of FIG. 3.
Figure 6:
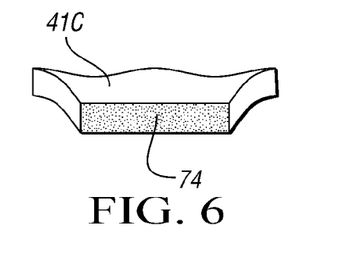
FIG. 6 is a schematic perspective illustration in fragmentary view of a third alternate embodiment of the extension of FIG. 3.

In FIG. 5, an alternate extension 41B has rounded edges 72A, 72B that slightly reduce the surface area 44C of extension 41B that will interface with surface area 42 of flange 18. In FIG. 6, an alternate extension 41C has a corrosion-inhibiting coating 74 added to the surface facing the surface 42 of the wheel flange 18 of FIGS. 1 and 2. Thus, the coating 74 will be located at and partially form the gap 40 of FIGS. 1 and 2. The coating 74 could be an electrocoating, a powder coating, an ultraviolet coating, or any other suitable coating that will reduce the likelihood of corrosion of the extension 41C.

Figure 7:
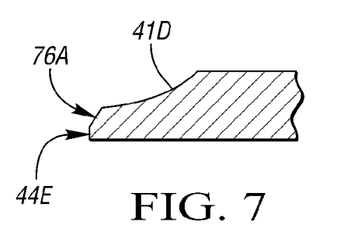
FIG. 7 is a schematic cross-sectional illustration in fragmentary view of a fourth alternate embodiment of the extension of FIG. 3.
Figure 8:
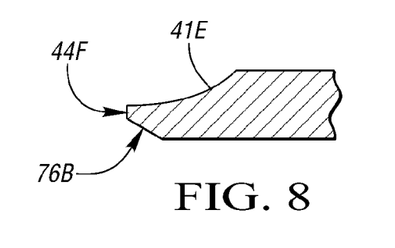
FIG. 8 is a schematic cross-sectional illustration in fragmentary view of a fifth alternate embodiment of the extension of FIG. 3.
Figure 9:
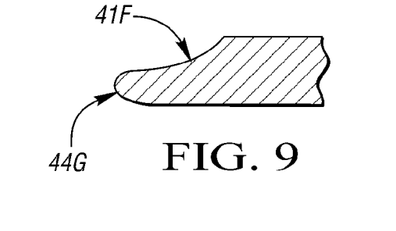
FIG. 9 is a schematic cross-sectional illustration in fragmentary view of a sixth alternate embodiment of the extension of FIG. 3.

FIGS. 7-9 show still alternate extensions that minimize surface area of the portion of the extension that will form the gap 40 of FIGS. 1 and 2. FIGS. 7-9 are views of alternate extensions taken at the same location as the cross-sectional views of FIGS. 1 and 2. Specifically, FIG. 7 shows an extension 41D having a profile with a minimal surface area 44E sufficient to form a portion of the secondary load path P2 shown in FIG. 2 without breaking, but with a smaller contact area that the extension 41 of FIGS. 1 and 2. The profile is defined by surface 44E in combination with another angled surface 76A that tapers to surface 44E. The extension 41E of FIG. 8 has a similarly reduced surface area 44F that will define the gap 40 with flange 18, and is sufficient to form a portion of secondary load path P2 without breaking The angled surface 76B tapers to surface 44F (the contact surface) to define the profile of extension 41E. FIG. 9 shows another alternate extension 41F shaped similarly to extension 41 of FIG. 3 except with smoothed edges to create a smoothed contact surface area 44G.

Figure 10:
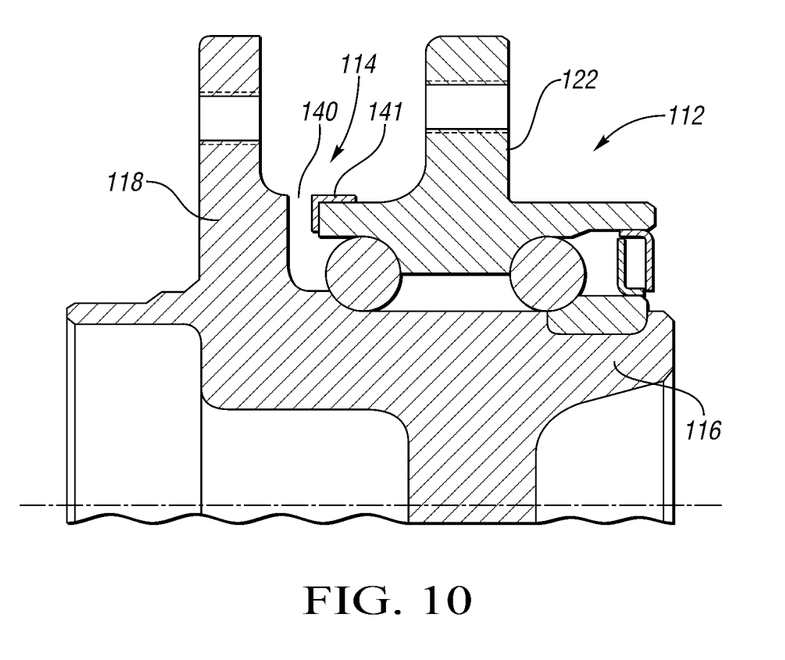
FIG. 10 is a schematic cross-sectional illustration of a portion of the wheel bearing assembly of FIG. 1 having a shim as a corrosion-inhibiting feature.

FIGS. 10 and 11 demonstrate the use of one or more shims as corrosion-inhibiting features at the aforementioned predetermined gap in an apparatus forming a secondary load path. FIG. 10 shows a wheel bearing assembly 112 with an apparatus 114 including a rotatable wheel hub 116, also referred to as a first component, and a bearing outer ring 122, also referred to as a second component, functioning in all respects the same as described with respect to wheel bearing assembly 12. A shim 141 is secured to the bearing outer ring 122. The shim 141 is shown on a similar extension of the bearing outer ring 122 opposite the location of the extension 41 of bearing ring 12 in FIG. 1. The shim 141 may be annular, surrounding the perimeter of the bearing outer ring annulus. The shim 141 partially defines a gap 140 of predetermined width between the flange 118 and the bearing outer ring 122. When the wheel hub 116 is displaced toward the bearing outer ring 122 upon application of a force, the gap 140 is of a predetermined size that will close, allowing a secondary load path to be formed from the wheel hub 116 to the bearing outer ring 122, bypassing the bearing races, as described with respect to the wheel bearing assembly 12 of FIGS. 1-3. The shim 141 is a stainless or coated steel or other material selected for its corrosion resistance. Thus, the shim 141 helps to prevent corrosion of the wheel hub 116 and bearing outer ring 122 from causing noise, drag, or even wheel lock-up.

Figure 11:
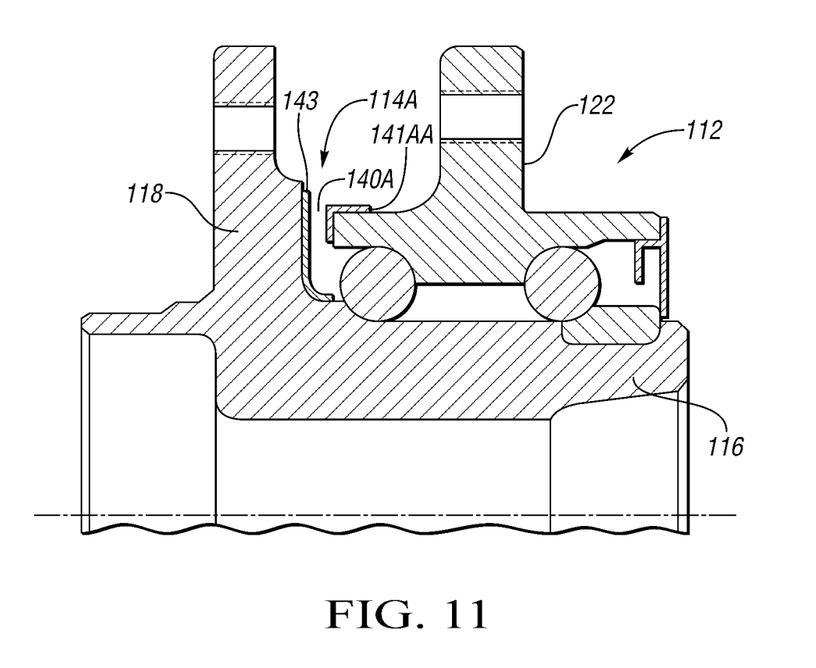
FIG. 11 is a schematic cross-sectional illustration of a portion of the wheel bearing assembly of FIG. 1 having two shims as corrosion-inhibiting features.

FIG. 11 shows the wheel bearing assembly 112 with an apparatus 114A that includes the wheel hub 116 and bearing outer ring 122 to partially define a secondary load path that bypasses the bearing races, as discussed with respect to FIGS. 1-3. The apparatus 114A further includes not only a shim 141AA arranged like shim 141 of FIG. 10 and referred to as a second shim, but also shim 143, referred to as a first shim. Shim 143 is connected for rotation with the wheel hub 116. Surfaces of the shims 141AA, 143 face one another and define a gap 140A of predetermined width therebetween. When the gap 140A is closed to provide a secondary load path from the wheel hub 116 to the bearing outer ring 122, the load path is also partially defined by and is carried through the shims 141AA, 143. Shim 143 may also be a stainless steel, coated steel, or other suitable corrosion-inhibiting material. In another embodiment, only shim 143 may be used as the corrosion-inhibiting feature. Furthermore, the extension 41 of FIG. 1 may have a shim connected to cover surface 44. The use of the shims 141 or 141AA and 143 may allow existing wheel bearing assemblies to be retrofitted to provide a secondary load path as described, because the thickness of the shims 141 or 141AA and 143 can be adjusted to control the width of the gap 140, rather than modifying either the wheel hub 116 or the bearing outer ring 122.

Figure 12:
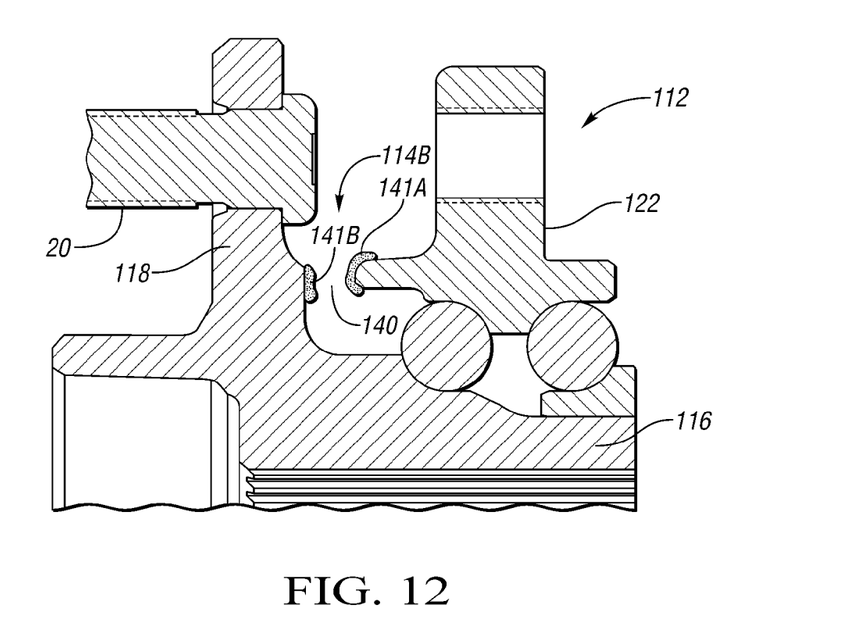
FIG. 12 is a schematic cross-sectional illustration of a portion of the wheel bearing assembly of FIG. 1 having a coating as a corrosion-inhibiting feature.

FIG. 12 shows yet another corrosion-inhibiting feature at the aforementioned predetermined gap of a wheel bearing assembly 112. Specifically, an apparatus 114B includes a coating 141A applied to the bearing outer ring 122, and a coating 141B applied to the wheel hub 116. The coatings 141A and 141B are applied to the bearing outer ring 122 and wheel hub 116 at surfaces of the components that define the predetermined gap 140. Thus, when a force is applied to the wheel hub 116 at the flange 118 to close the gap 140, the coated surfaces of the wheel hub 116 and the bearing outer ring 122 will contact one another. By placing the coatings 141A and 141B at the gap 140, corrosion of the wheel hub 16 or bearing outer ring 122 will be prevented at the area of the gap 140. In other embodiments, only one of the wheel hub 116 or the bearing outer ring 122 may have the coating 141A or 141B. The coatings 141A, 141B may be electrocoatings, powder coatings, ultraviolet coatings, or other suitable coatings.

Figure 13:
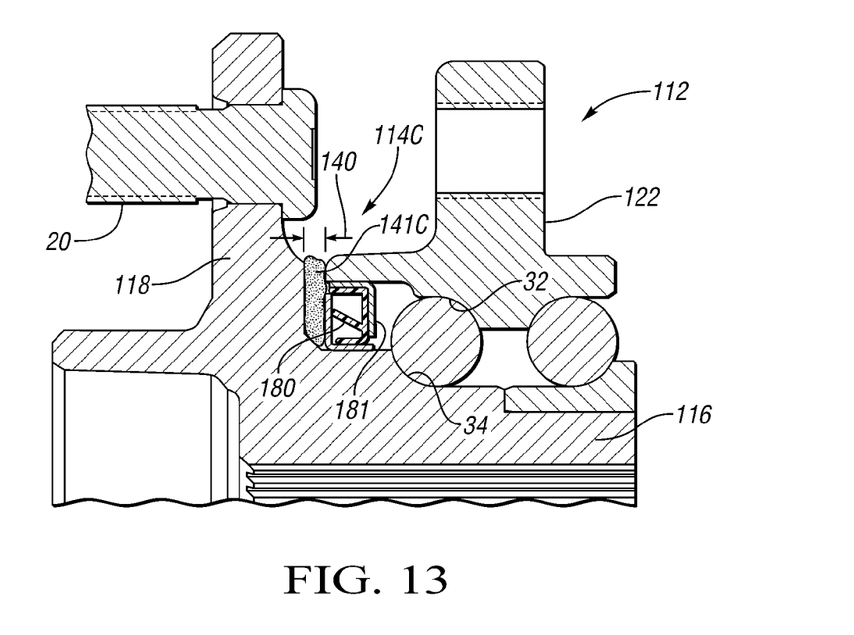
FIG. 13 is a schematic cross-sectional illustration of a portion of the wheel bearing assembly of FIG. 1 having a lubricant as a corrosion-inhibiting feature.

Referring to FIG. 13, another apparatus 114C with a corrosion-inhibiting feature at a gap 140 is illustrated. The corrosion-inhibiting feature is a lubricant 141C inserted into the gap 140. An outboard bearing seal 180 held by a steel stamping 181 protects the races 32, 34 from dirt and debris, and helps to hold the lubricant 141C at the gap 40. Suitable lubricants include grease and nickel anti-seize, and may perform best if water resistant.

Figure 14:
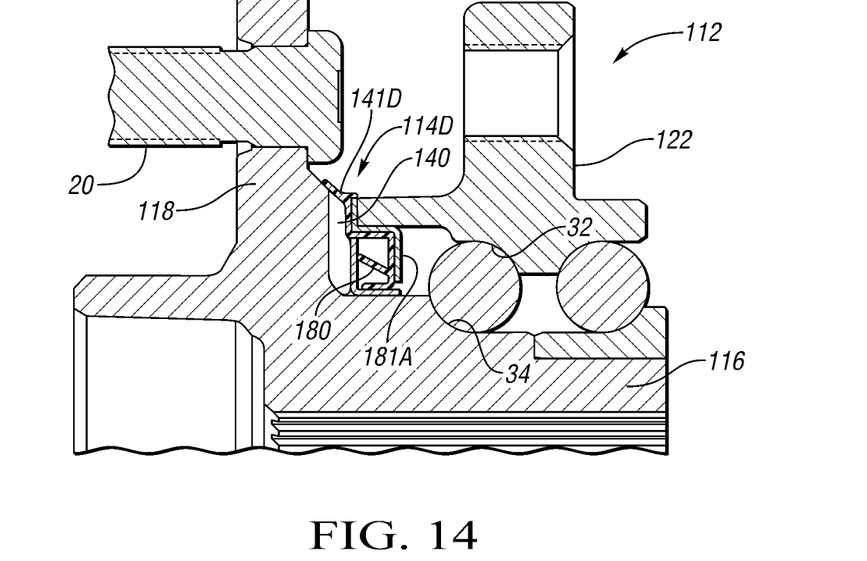
FIG. 14 is a schematic cross-sectional illustration of a portion of the wheel bearing assembly of FIG. 1 having a first embodiment of a seal as a corrosion-inhibiting feature.
Figure 15:
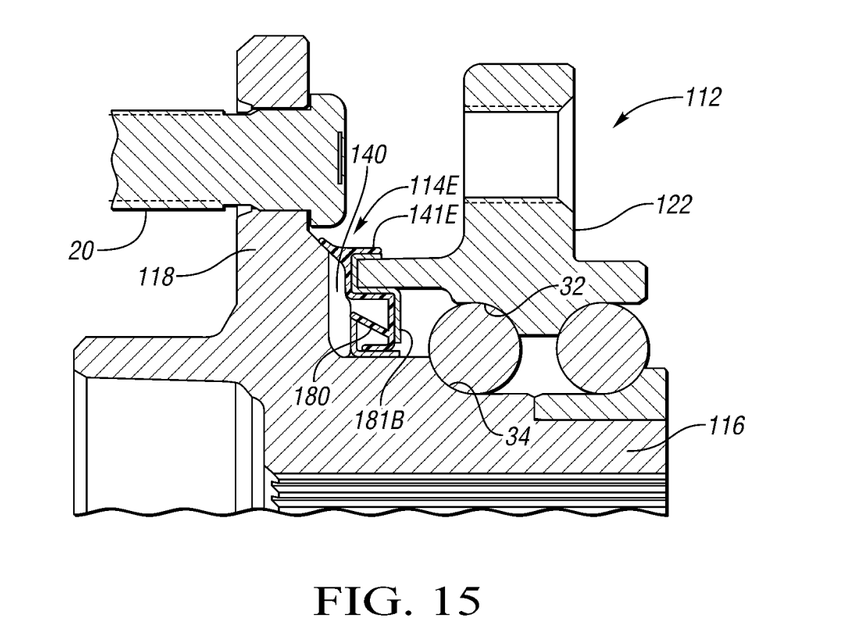
FIG. 15 is a portion of the wheel bearing assembly of FIG. 1 having a second embodiment of a seal as a corrosion-inhibiting feature.

FIGS. 14 and 15 show different embodiments of seals positioned radially-outward of the gap 140 and configured to span the gap 140 between the wheel hub 116 and bearing outer ring 122 to prevent moisture and debris from corroding the wheel hub 116 and bearing outer ring 122 at the gap 140. In FIG. 14, the corrosion-inhibiting feature of apparatus 114D is an additional lip 141D of an extended molded seal continuous with the outboard bearing seal 180 molded to steel stamping 181A. In FIG. 15, the corrosion-inhibiting feature of apparatus 114E is an additional lip 141E molded to a radially-outer surface of steel stamping 181B of an outboard bearing seal 180. The steel stamping 181B extends around the annulus of bearing outer ring 122 to a radially-outer surface to provide an additional molding surface for the lip 141E. With either design, the lip 141D or 141E spans between the wheel hub 116 and the bearing outer ring 122 to protect debris from entering the gap 140, and thus inhibiting corrosion at the surfaces of the wheel hub 116, and bearing outer ring 122 defining the gap 140. The use of the steel stampings 181A or 181B may allow existing wheel bearing assemblies to be retrofitted to provide a secondary load path as described, because the thickness of the steel stamping 181A or 181B can be adjusted to control the width of the gap 140, rather than modifying either the wheel hub 116 or the bearing outer ring 122.

Figure 3:
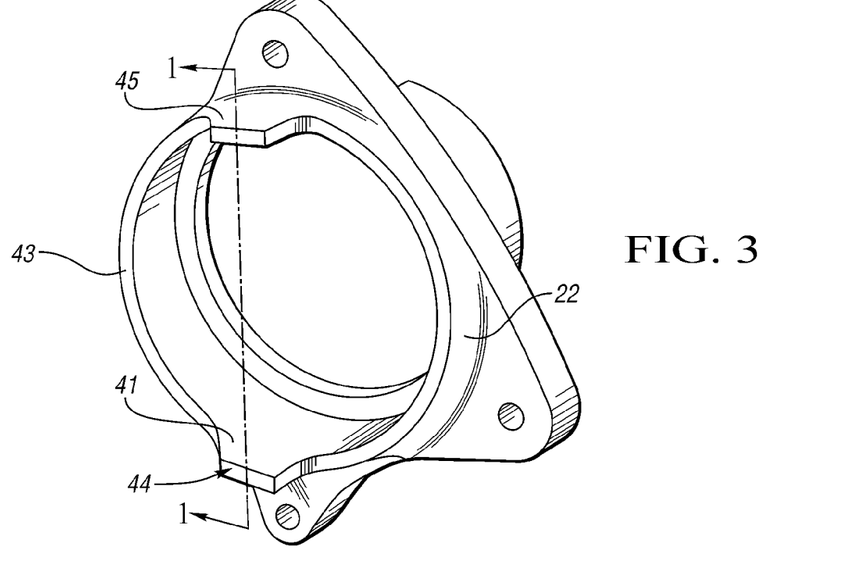
FIG. 3 is a schematic perspective illustration of a nonrotating component of the wheel bearing assembly of FIGS. 1 and 2 showing the extension.
Figure 16:
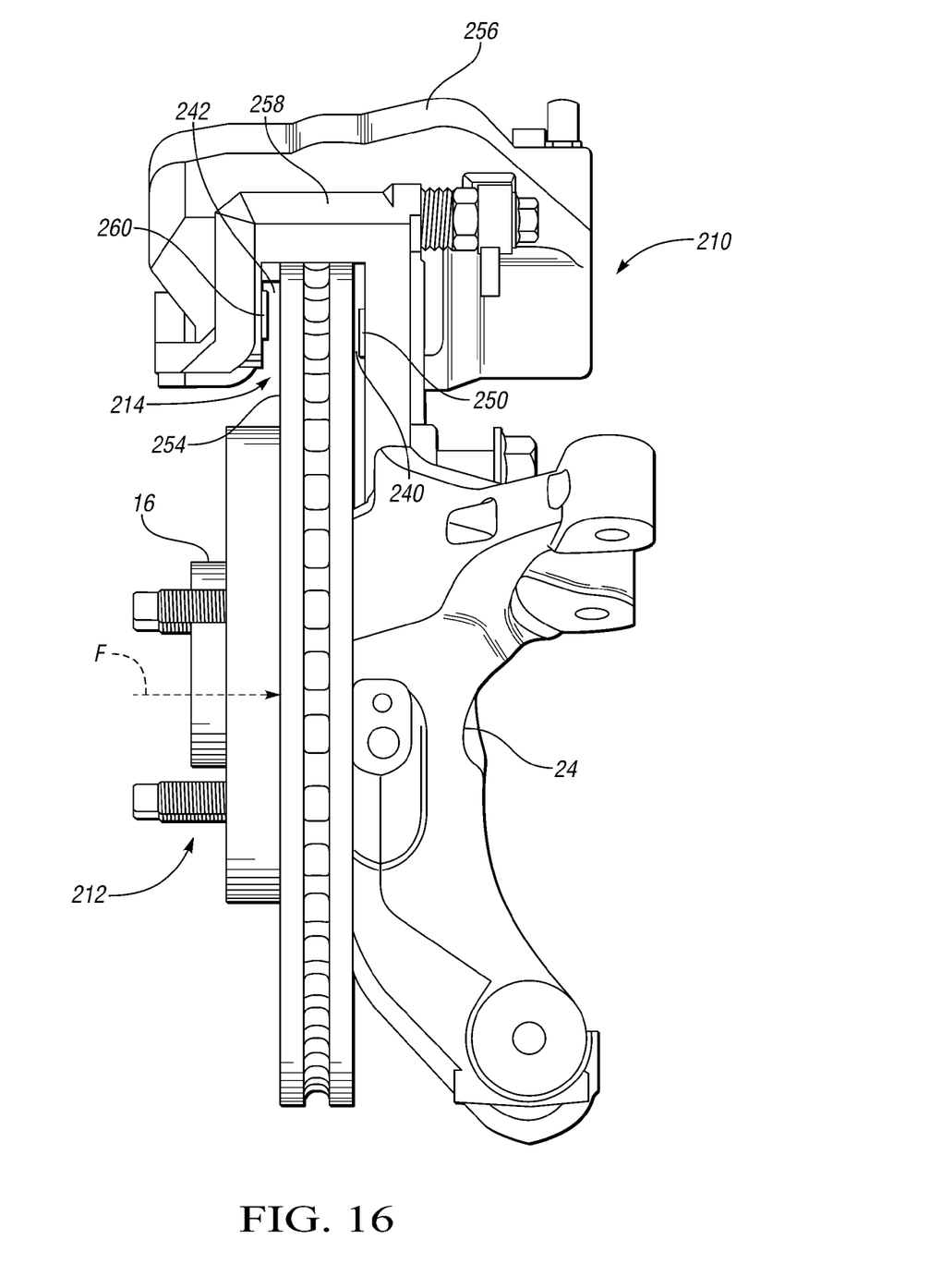
FIG. 16 is a schematic partially cross-sectional illustration of an apparatus to provide a secondary load path through a brake caliper bracket and brake rotor that bypasses the wheel bearing races, shown prior to an applied force.

Referring to FIG. 16, a corner assembly portion of another vehicle 210 is shown from above, with the vehicle suspension structure 24 of FIGS. 1-3 shown in greater detail. The bearing assembly 212 includes rotatable hub 16 and outer ring 22 (not visible) as described with respect to FIG. 1-2. A brake assembly is shown with brake rotor 254 connected for rotation with the hub 16, a brake caliper 256 secured to the vehicle suspension structure 24, and a floating-type brake caliper bracket 258.

An apparatus 214 is provided that creates a secondary load path upon application of a sufficient force. The secondary load path bypasses the races of the bearing assembly 212. Much of the bearing assembly 212 is not visible in the plan view of FIG. 4; however, bearing assembly 212 is substantially identical to bearing assembly 12 of FIGS. 1-2. The apparatus 214 includes an extension 250, which may be a shim or nub, at a lower portion (below the axis of rotation) of the inboard side of the caliper bracket 258, extending outboard toward the rotor 254. The apparatus 214 further includes an extension 260, which may be a shim or nub, placed relatively high (above the axis of rotation) on an outboard side of the caliper bracket 258 and extending inboard toward an upper portion of the rotor 254. In the overhead view of FIG. 16, both extensions 250, 260 appear to be at the same level; however, extension 260 is higher than extension 250.

Upon application of the force F, a moment is created on the wheel hub 16 that causes movement of the wheel hub 16 and the rotor 254 to close a predetermined gap 240 normally existing between the extension 250 and the rotor 254, with the extension 250 contacting the rotor 254. (The force F is shown in phantom, applied to a lower portion of the rotor 254 below the hub 16 that is not visible in FIG. 4.) Furthermore, a gap 242 is closed between the extension 260 and the rotor 254. Thus, a secondary load path is created from the rotor through the extensions 250, 260 to the brake caliper bracket 258, to the attached suspension structure 24. The gaps 240, 242 are of predetermined sizes based on their relative distances from the axis of rotation of the bearing assembly 212 so that they will be closed by displacement of the rotor 254 and establish the secondary load path upon a sufficient force F, thus preventing excessive Brinell damage to the races of the bearing assembly 212. When an applied force is less than a predetermined amount, the gaps 240, 242 do not close, and the entire load is carried through the load path that passes through the bearing assembly 212. Any of the corrosion-inhibiting features of FIGS. 1-15 may be used to inhibit corrosion of the components forming the gaps 240 and 242. For example, extensions 250, 260 may be coated, may have a surface area-minimizing profile, lubricants may be inserted in the gap, etc.

Figure 17:
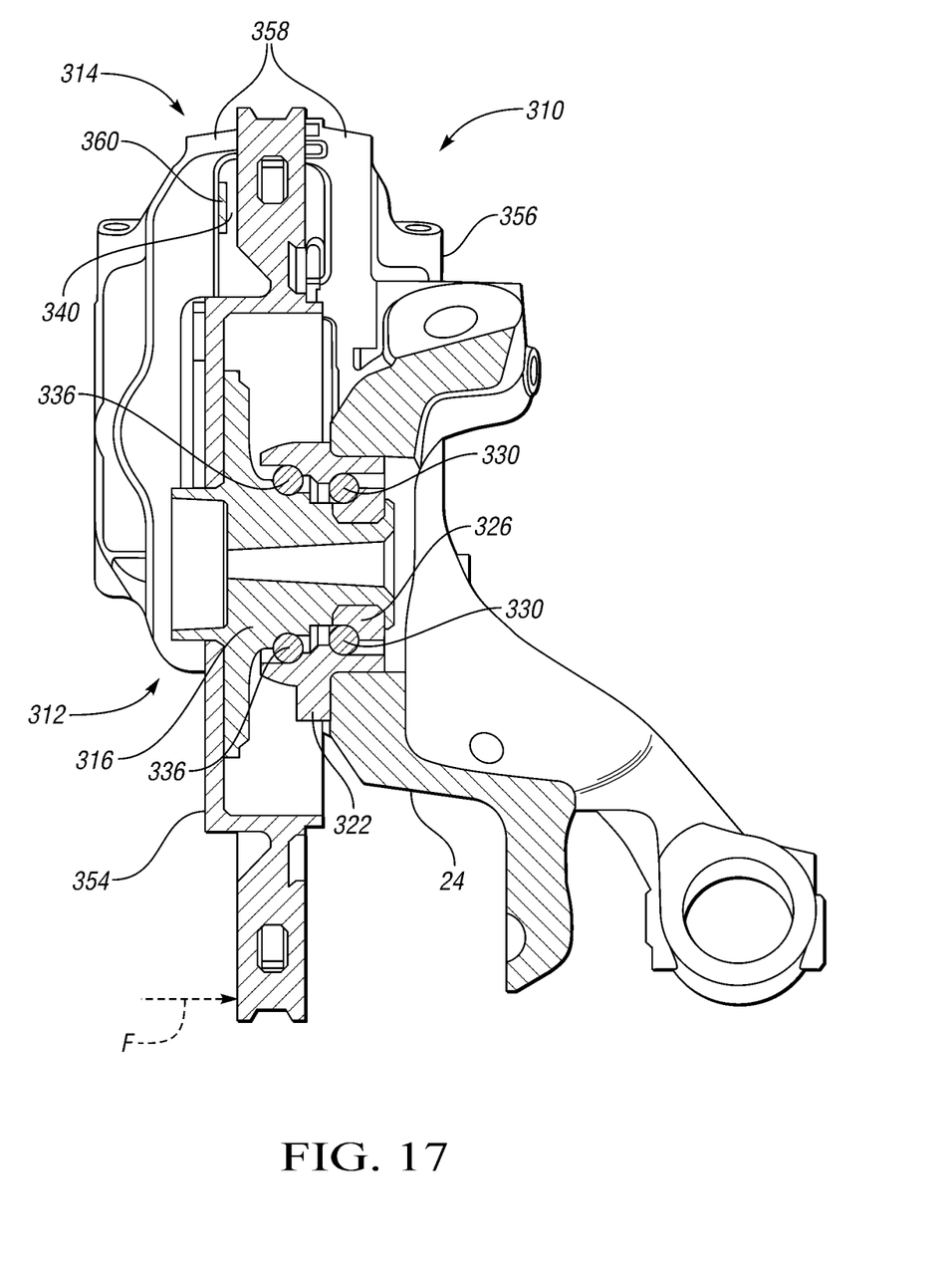
FIG. 17 is a schematic partially cross-sectional illustration of another apparatus to provide a secondary load path through a brake caliper bracket and brake rotor that bypasses the wheel bearing races, shown prior to an applied force.

Referring to FIG. 17, a corner assembly portion of another vehicle 310 is shown in a cross-sectional side view, with the vehicle suspension structure 24 of FIGS. 1-2 shown in greater detail. A bearing assembly 312 has a rotatable hub 316 to which the wheel (not shown) is connected for rotation, as is known. The bearing assembly 312 also has an outer ring 322 fixed to the suspension structure 24. Rolling elements 330, 336 roll along races visible in FIG. 17 formed by the outer ring 322, the hub 316 and an inner ring 326.

A brake assembly is shown with brake rotor 354 connected for rotation with the hub 316, a brake caliper 356 secured to the vehicle suspension structure 24, and a brake caliper bracket 358. An apparatus 314 is provided that creates a secondary load path upon application of sufficient force F. The secondary load path bypasses the races of the bearing assembly 312. The apparatus 314 includes an extension 360, which may be a shim or nub, placed relatively high (above the axis of rotation) on the brake caliper bracket 358 outboard of the brake rotor 354 and extending inward toward the brake rotor 354. The extension 360 is configured to form a predetermined gap 340 between the extension 360 and the brake rotor 354. Another extension, shim or nub is placed relatively low on the brake caliper bracket 358, inboard of the brake rotor 354 and extends outward toward the brake rotor 354 to form another predetermined gap between the caliper 358 and the rotor 354. This extension is not visible in FIG. 17, as it is behind the hub 316 on the inboard portion of the caliper 358. Any of the corrosion-inhibiting features of FIGS. 1-15 may be used to inhibit corrosion of the components (e.g., extension 360) forming the gap 340.

Figure 18:
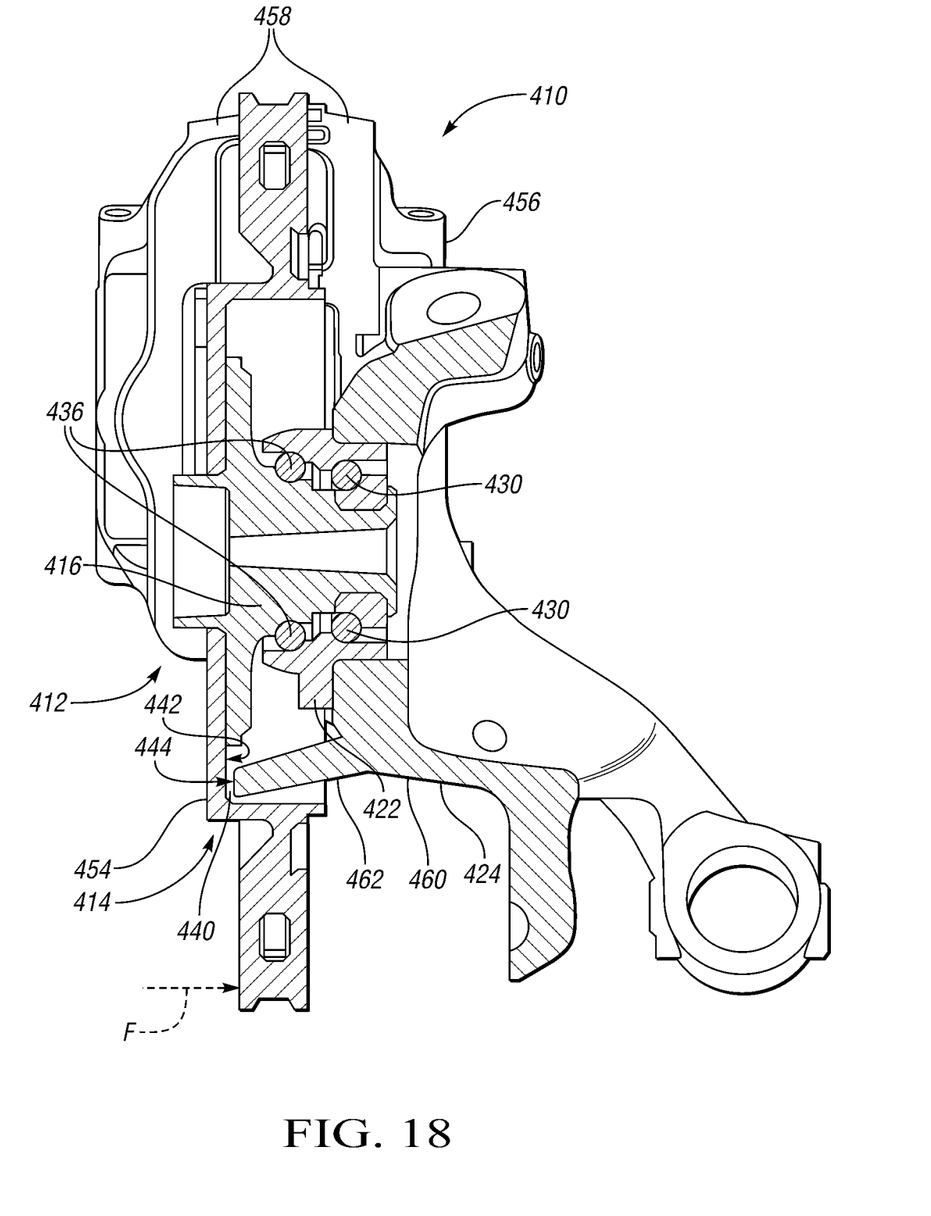
FIG. 18 is a schematic partially cross-sectional illustration of an apparatus to provide a secondary load path through a steering knuckle and a brake rotor that bypasses the wheel bearing races, shown prior to an applied force and having yet another alternate corrosion-inhibiting feature.

Referring to FIG. 18, a corner assembly portion of another vehicle 410 is shown in a cross-sectional side view. A bearing assembly 412 is provided that is substantially identical to bearing assembly 312 as described with respect to FIG. 5. A brake rotor 454, brake caliper 456 and brake caliper bracket 458 are as described with respect to like components of FIG. 17, except that the brake caliper bracket 458 is not configured with extensions, shims or nubs to create a secondary load path. The bearing outer ring 422 and caliper bracket 456 are secured to suspension structure 424. Rolling elements 430, 436 roll along races visible in FIG. 18 formed by the outer ring 422, the hub 416 and an inner ring 426.

An apparatus 414 creating a secondary load path as discussed below is provided by an extension 462 of a steering knuckle 460 or other portion of the suspension structure 424 that is sized to create a predetermined gap 440 between an inboard facing surface 442 of the brake rotor 454 and an outboard facing surface 444 of the extension 462.

Under normal vehicle operating conditions, including high speed G turns below a certain magnitude and other events that generate a force F less than a predetermined amount, the gap 440 is at least partly maintained and the surfaces 442, 444 do not contact one another. Thus, a load path for such low level curb events is carried from the rotor 454 through the hub 416, rolling elements 430, 436, and bearing races to the outer ring 422 and suspension structure 424.

When an applied force F reaches a predetermined level, the apparatus is configured so that inboard movement of the rotor 454 caused by a clockwise moment on the rotor 454 due to the force F will cause surface 442 to contact surface 444. The secondary load path is thus created from the rotor 454 to the extension 462 and suspension structure 424 that bypasses the bearing 412, carrying some of the load in parallel with a portion of the load carried along the initial load path through the races, thus preventing Brinell damage to the bearing races. Any of the corrosion-inhibiting features of FIGS. 1-15 may be used to inhibit corrosion of the components (rotor 454 and extension 462) forming the gap 440.

While the best modes for carrying out the invention have been described in detail, those familiar with the art to which this invention relates will recognize various alternative designs and embodiments for practicing the invention within the scope of the appended claims.

The invention claimed is:

1. An apparatus for a vehicle having a wheel and a wheel bearing assembly supporting the wheel for rotation; wherein the wheel bearing assembly has bearing races; the apparatus comprising:
a first component mounted for rotation with the wheel;
a second component spaced from the first component to establish a predetermined gap and not connected for rotation with the wheel;
wherein one of the first component and the second component is displaced relative to the other upon application of a force to close the gap to at least partially form a load path for the force from the first component to the second component when the load path bypasses the bearing races;
wherein the second component forms an annulus; wherein the annulus has an extension positioned at a predetermined location offset from an axis of rotation of the first component; wherein the extension forms a portion of the load path when the gap is closed; and
wherein the extension is confined to only a segment of the annulus.

2. The apparatus of claim 1, wherein the extension has a surface that defines the gap; and wherein the extension tapers to the surface.

3. The apparatus of claim 1, wherein the extension has a surface that defines the gap; and wherein the extension has edges at the surface that are rounded.

4. The apparatus of claim 1, wherein the extension has a surface that defines the gap; and wherein the extension has a notch in the surface.

5. The apparatus of claim 1, wherein the extension contacts a surface of the first component when the gap is closed; and further comprising:
a coating covering at least a portion of one of the extension and the surface of the first component.

6. The apparatus of claim 1, further comprising:
a shim operatively connected to at least one of the first component and the extension.

7. The apparatus of claim 6, wherein the shim is a first shim connected for rotation with the first component; and further comprising:
a second shim connected to the second component; and wherein the first shim contacts the second shim when the gap is closed.

8. The apparatus of claim 6, wherein the shim is coated steel.

9. The apparatus of claim 1, wherein the first component is a portion of a wheel hub and the second component is a wheel bearing outer ring.

10. The apparatus of claim 1 wherein the first component is a wheel hub;
wherein the second component is a bearing outer ring;
wherein the extension is a first extension at a first segment of the annulus;
wherein the first extension forms a portion of the load path when the gap is closed; and wherein the annulus has a second extension at a second segment of the annulus opposite the first segment of the annulus.

11. An apparatus for a vehicle having a wheel and a wheel bearing assembly supporting the wheel for rotation; wherein the wheel bearing assembly has bearing races; the apparatus comprising:
a first component mounted for rotation with the wheel;
a second component spaced from the first component to establish a predetermined gap and not connected for rotation with the wheel;
wherein one of the first component and the second component is displaced relative to the other upon application of a force to close the gap to at least partially form a load path for the force from the first component to the second component when the load path bypasses the bearing races; and
wherein a lubricant at least partially fills the gap.

12. An apparatus for a vehicle having a wheel and a wheel bearing assembly supporting the wheel for rotation; wherein the wheel bearing assembly has bearing races; the apparatus comprising:
a brake rotor mounted for rotation with the wheel;
a brake caliper bracket spaced from the brake rotor; wherein the brake caliper bracket has an extension extending inboard toward the brake rotor at a predetermined location offset from the axis of rotation of the brake rotor to establish a predetermined gap between the extension and the brake rotor; wherein the brake caliper bracket is not connected for rotation with the wheel; and
wherein one of the brake rotor and the brake caliper bracket is displaced relative to the other upon application of a force to close the gap to at least partially form a load path for the force from the brake rotor to the brake caliper bracket that bypasses the bearing races.

13. An apparatus for a vehicle having a wheel hub and a wheel bearing assembly supporting the wheel hub for rotation; wherein the wheel bearing assembly has a wheel bearing outer ring; wherein the wheel hub and the wheel bearing outer ring have bearing races; the apparatus comprising:
- a brake rotor mounted for rotation with the wheel hub;
- a steering knuckle having an extension that extends outboard further than the wheel bearing outer ring toward the brake rotor to establish a predetermined gap between the brake rotor and the steering knuckle;
- wherein the brake rotor is displaced relative to the steeling knuckle upon application of a force to close the gap to at least partially form a load path for the force from the brake rotor through the extension to the steering knuckle; and wherein the load path bypasses the bearing races.

* * * * *